Sept. 3, 1940.  L. W. STETTNER  2,213,748
GAS TORCH CONTROL VALVE
Filed Jan. 10, 1939
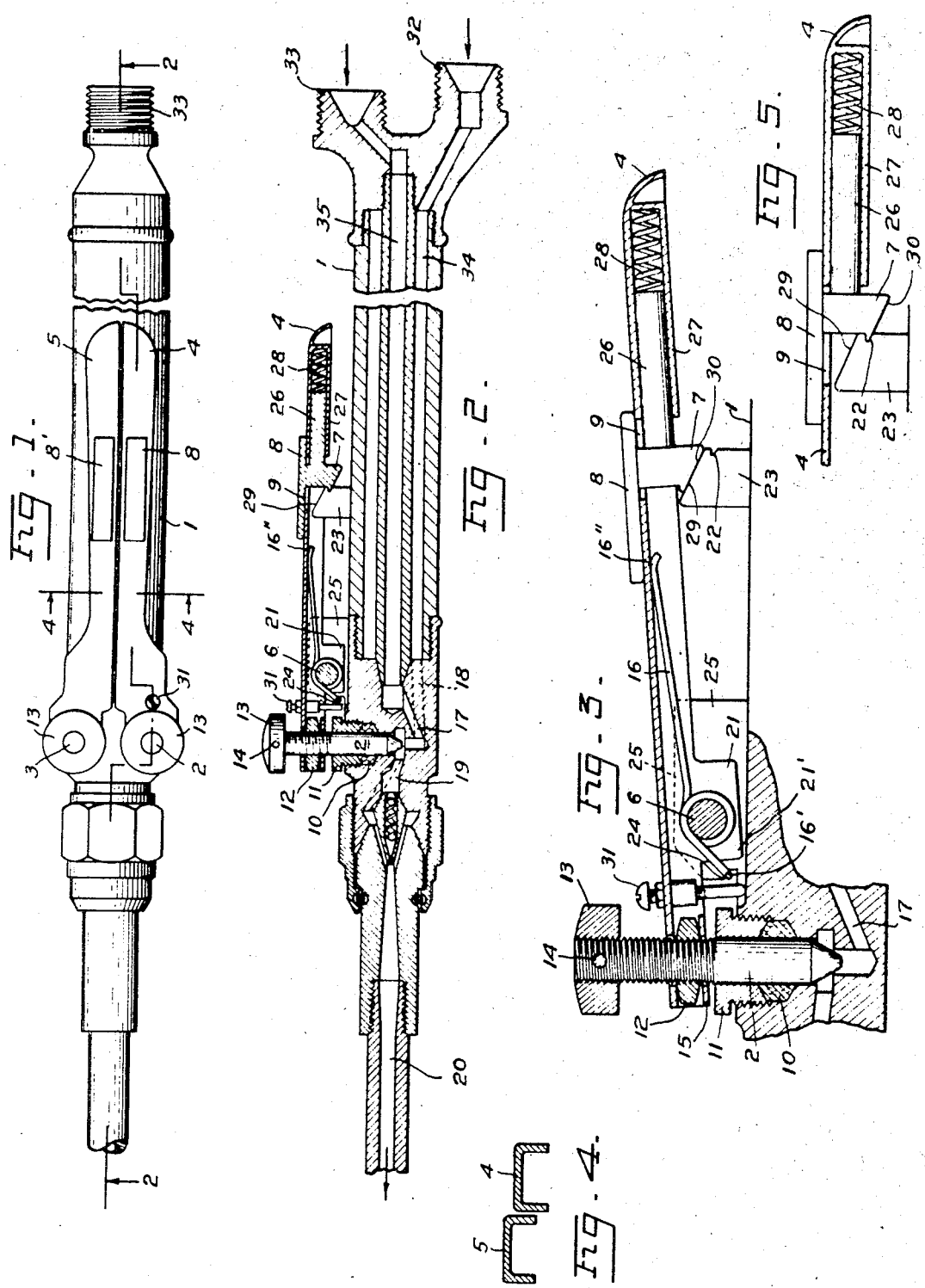
INVENTOR.
LUDWIG W. STETTNER
BY J. A. Bried
ATTORNEY.

Patented Sept. 3, 1940

2,213,748

UNITED STATES PATENT OFFICE 2,213,748

GAS TORCH CONTROL VALVE

Ludwig W. Stettner, Piedmont, Calif., assignor to Victor Equipment Co., San Francisco, Calif., a corporation of Delaware Application January 10, 1939, Serial No. 250,158

8 Claims. (Cl. 158—27.4)

This invention relates to gas welding and cutting torches and has for its objects an improved hand valve arrangement for controlling the flow of the two gases from the hose lines to the torch. A particular object is to provide simply operated means for locking both valves in open position. Another object is to provide for locking both valves in closed position, or with one closed and one slightly open sufficient to operate a pilot flame.

Another object is to provide valve control means as above but which automatically locks both valves closed, or with small pilot flame burning, upon release of the valve operating handles from locked open position. Another feature is to provide the valve locking means at a point of substantial travel of the valve operating handles to overcome changes in gas feed through slight movement of handles. Still on- other feature is to provide separate means for adjusting the flow of either gas independent of the position of the handles. Other features and advantages of the invention will appear in the following description and accompanying drawing.

In the drawing:

Figure 1 is a top plan view of the body of a welding torch fitted with my improved valve arrangement.

Figure 2 is a longitudinal cross section taken along the line 2—2 of Figure 1.

Figure 3 is an enlarged section of one of the valves and the remote end of its operating lever or handle shown locked out or in closed position but with stop arranged to permit small pilot flame to burn on one of the gases.

Figure 4 is a cross section of the two operating lever handles as seen from the line 4—4 of Figure 1.

Figure 5 is an enlarged elevation with parts in section showing the spring actuated lever locking latch locked down or in open position.

Described in more detail the invention comprises providing a gas torch 1 with a pair of needle valves 2, 3, each fitted with a lever handle 4, 5, pivoted at 6 to the torch body and extending side by side along the body of the torch so that they may readily be operated by the torch holding hand, and each lever is provided with a spring latch 7 so formed as to firmly lock its lever in both in or out (open or closed) position, yet permit either lever to be released from locked position by sliding a thumb releasing button or trigger 8, 8' operatively projecting through a slot 9 as indicated.

The needle valves are each slidable directly toward and from their seats through stuffing boxes comprising packing material 10 compressed by a threaded gland nut 11, and the upper or stem portions of the needle valves are each threaded through a square nut 12 engaged by the outer ends of the levers in a manner to hold the nuts against turning but permit the valve stems to be turned in the nuts by means of milled thumb nuts 13 pinned as at 14 to the extreme outer ends of the stems.

The square nuts 12 are retained in the levers by lower flanges 15 and are slightly arched on top and bottom as clearly shown in Figure 3 to permit slight automatic adjustment if required as the levers operate on their pivots 6. The threaded stems of the valves pass freely through holes in flanges 15 and the upper wall of the lever 4 as shown best in Figure 3 and a strong wire spring 16 forces the rear ends of the handles up or outward so as to normally urge the valves to closed position to shut off both streams of gas entering respectively to the valves from ports 17 and 18. When the rear ends of the lever handles 4, 5 are pressed down, or inward, toward the torch handle or body 1 the outer ends move the nuts 12 outward and open the valves, so that the gases from ports 17, 18 pass to the forward chamber 19 and into passage 20 to the torch nozzle (not shown).

The lever handles are always pressed down as far as they will go (as limited by stop lugs 21 formed on each handle) and are locked in place by a spring latch 7 on each lever engaging a notch 22 in a latch plate member or strap 23 secured to the torch body 1.

As shown in Figure 4 the two valve handles take the form of inverted channel sections arranged close together, and the heavy wire spring 16 is suitably coiled about the pivot pin 6 and its looped end 16' hooked under a lip 24 formed on the outer ends of the pivot supporting lugs 25 projecting upward from the torch body, while the two free ends 16" of the wire extend rearwardly and bear upwardly against the under sides of the handles to urge them outward.

The stop lugs 21 of the handles are extended portions of the side flanges of the handle levers and also surround the pivot pins 6 to form the pivotal joints of the handles.

The latches 7 at the rear ends of the handles which move slidably back and forth in slots 9 each have an elongated shank 26 which is slidably retained within the channel space in the under side of the handle by a retainer plate 27 suitably secured in place, and the latch is resiliently urged forward by a spiral compression spring 28. When either or both latches are unlatched from the open, locked position of Figure 5, the handles if released will fly outward to close the valves and the latches will automatically spring inward to override the beveled upper end 29 of the latch plate and securely lock the levers with valves closed against again being opened unless triggers 8, 8' are pulled back with the thumb.

It is evident from the formation of the slanted under surface 30 of latch 7 and cooperating upper surface 29 of the latch plate that either handle will be locked out the instant its valve is tightly seated, and this is independent of the adjustment of either valve stem in its nut 12. Ordinarily this would make it impossible to retain the acetylene feed slightly open to sustain a pilot if desired, for if its valve stem were unscrewed a trifle, the spring 16" would simply urge the handle out further until the valve was forced down and closed, although if the unscrewing of the valve were carried to the point where the front corner 21' of stop lug 21 touched the body of the torch, or lever flange 15 came into contact with the top of gland nut 11, the spring could not force the lever outward any further and the valve could be adjusted to remain slightly open to maintain an acetylene pilot flame. This is also true of the oxygen valve if desired to feed just a bit of oxygen into it.

However, to provide an adjustable downward stop for the outer end of the acetylene lever, or both levers, a screw 31 may be fitted into the forward part of the lever so that its limited downward movement may be adjusted to suit.

In use the two gases are supplied from flexible hoses suitably coupled to the inlet ends 32, 33 of the torch handle gas passages 34, 35 at the regulated pressures desired, and all desired control of these gases to the torch nozzle may readily be secured by adjustment of the valve thumb nuts 13, thus obviating any requirement for additional shut-off valves as usually provided adjacent the points of connection to the gas supply hoses.

A feature of great importance is that both valves are not only locked in open position so that the levers need not be held down by hand, but are also automatically locked in closed position, or with a small pilot running, as this overcomes the otherwise great danger of a long dangerous flame shooting out if the torch were inadvertently dropped, or if someone accidentally dropped something on the handles while the torch was lying on the bench or floor with pilot burning.

Having thus described my invention it will be manifest that many minor changes may be made in the construction within the spirit of the invention and scope of my appended claims.

I claim:

1. In a gas torch of the character described having an elongated body portion adapted to be held by the operator, and two gas supply passages in said body for supplying gases to the burner end of the torch, a pair of valves arranged for closing and opening said passages respectively, a handle for manually operating each valve positioned for operation separately or together by the hand holding said body, means for independently locking the handles in both open and in closed position of the valves, and means for adjusting one of said valves to remain slightly open when its handle is in closed locked position.

2. In a gas torch of the character described, a valve for closing a gas passage having a slidably mounted projecting stem, a nut threaded on said stem, a handle pivoted to the torch body and engaging said nut against turning and in a manner for positively forcing said stem in either direction upon the operation of said handle, spring means operative against and forcing said handle toward closed position of said valve, and means to provide for screwing said stem back and forth through said nut to determine the opening of the valve at a given position of said handle, and a latch mounted on said handle formed to lock said handle with valve open and also in closed position.

3. In a gas torch of the character described, a valve for closing a gas passage having a slidably mounted projecting stem, a nut threaded on said stem, a handle pivoted to the torch body and engaging said nut to prevent its turning and in a manner for positively forcing said stem in either direction upon the operation of said handle, spring means operating against and forcing said handle toward closed position of said valve, and means to provide for screwing said stem back and forth through said nut to determine the opening of the valve at a given position of said handle, and a stop adjustable with reference to said handle to optionally hold said valve slightly open against the action of said spring means.

4. In a gas torch of the character described having an elongated body portion adapted to be held by the operator, and two gas supply passages in said body for supplying gases to the burner end of the torch, a pair of valves arranged for closing and opening said passages respectively, a handle for manually operating each valve positioned for operation by the hand holding said body, and means for locking the handles in both open and in closed position of the valves, and means for adjusting each valve toward open and closed positions independent of the movement of said handles.

5. In a gas torch of the character described having an elongated body portion adapted to be held by the operator, and two gas supply passages in said body for supplying gases to the burner end of the torch, a pair of valves arranged for closing and opening said passages respectively, a handle for manually operating each valve positioned for operation by the hand holding said body, and means for locking the handles in both open and in closed position of the valves comprising a spring latch to lock the valve handle in open position and provided with a portion forming a stop against opening movement from any other position of the valve handle.

6. In a gas torch of the character described having an elongated body portion adapted to be held by the operator, and two gas supply passages in said body for supplying gases to the burner end of the torch, a pair of valves arranged for closing and opening said passages respectively, a handle for manually operating each valve extending side by side along the body of the torch positioned for operation by the hand holding said body, and means for locking the handles in both open and in closed position of the valves comprising a slidably mounted spring latch on each handle provided with a finger releasing portion accessible at the outer side of the handle, a locking lip cooperating with said latch to hold the handle locked in one position of the valve, and a heel portion to hold the handle locked in the opposite position of the valve.

7. A gas torch of the character described comprising, a tubular body for holding in the hand and having a gas passage within, a valve for closing said gas passage having a slidably mounted stem projecting outwardly at the side of said body, a nut on said stem, a lever handle pivoted to and extending alongside of said body, said handle adjacent its pivotal connection to the body formed to embrace said nut to prevent its turning and said stem extending through said lever so that movement of the lever in either direction will positively slide the valve stem likewise, and means accessible at the end of said stem for screwing the stem back and forth through said nut to determine the opening of said valve at a given position of said handle.

8. A gas torch of the character described comprising, a tubular body for holding in the hand and having a gas passage within, a valve for closing said gas passage having a slidably mounted stem projecting outwardly at the side of said body, a nut on said stem, a lever handle pivoted to and extending alongside of said body, said handle adjacent its pivotal connection to the body formed to embrace said nut to prevent its turning and said stem extending through said lever so that movement of the lever in either direction will positively slide the valve stem likewise, and means accessible at the end of said stem for screwing the stem back and forth through said nut to determine the opening of said valve at a given position of said handle, and spring means operative against and urging said handle toward closed position of said valve.

LUDWIG W. STETTNER.